Feb. 16, 1937.    H. O. PETERSON    2,070,958
FREQUENCY DETERMINING SYSTEM
Filed May 8, 1931
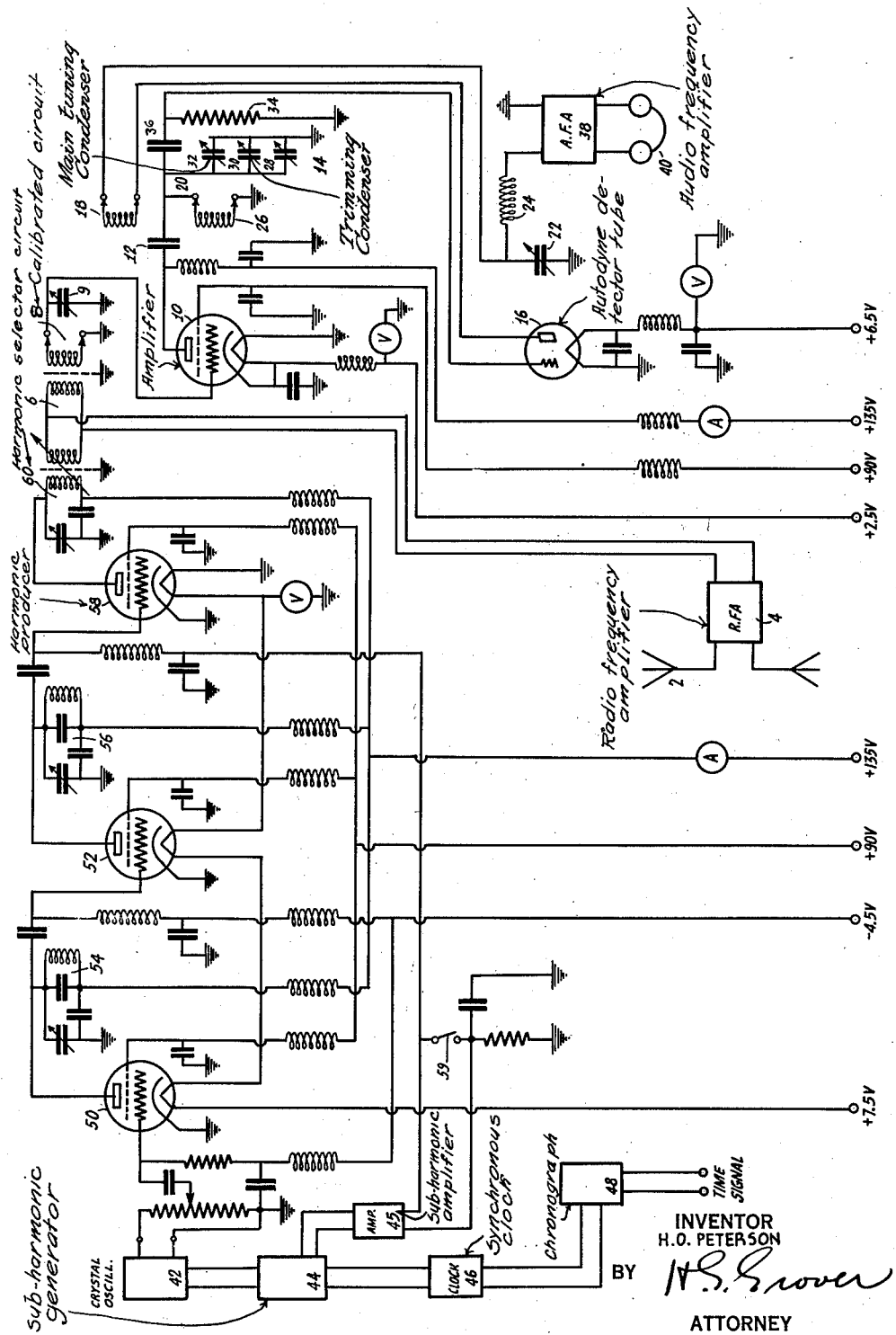
INVENTOR
H.O. PETERSON
BY H.S. Grover
ATTORNEY Patented Feb. 16, 1937

2,070,958

UNITED STATES PATENT OFFICE 2,070,958

FREQUENCY DETERMINING SYSTEM

Harold O. Peterson, Riverhead, N. Y., assignor to Radio Corporation of America, a corporation of Delaware Application May 8, 1931, Serial No. 535,910

9 Claims. (Cl. 250—39)

This invention relates to a system for the determination of a characteristic of an electrical high frequency undulatory source and has as an object the provision of a new and useful method and means for accurately determining the frequency of a radio frequency transmitting station.

It is a further object of this invention to locate a transmitting station between harmonics of known frequency whereby, by suitable interpolation, the frequency of the transmitting station may be determined.

It is a further object of this invention to increase the accuracy of such interpolation by adding or subtracting from one of the harmonics between which the station whose frequency is to be determined has been located, harmonics of a known sub-harmonic. Consequently, the frequency of the transmitting station may be further more accurately determined by the addition of the harmonic of the sub-harmonic to one of the harmonics between which the station has been located. As the station may be located between two harmonics of the sub-harmonic a further more accurate determination may be obtained by interpolating the position of a station between the harmonics of the sub-harmonic which gives the station signal.

Although not limited thereto, a very convenient way of carrying out the present invention is by the use of an autodyne receiver by means of which zero beat may be obtained between the oscillation frequency of the autodyne detector and the incoming frequency to which the autodyne is tuned. The condition termed "zero beat" is, of course, well understood in the art.

By first obtaining an indication or a signal from a transmitter whose frequency is to be determined by the use of an autodyne and then tuning the autodyne to produce a zero beat with energy preferably harmonic energy of known frequency to one side of the station and then producing a zero beat between the autodyne and harmonic energy of known frequency to the other side of the station, and then noting the position of the station between the harmonics adjacent the station which gave the zero beat notes the station frequency may readily be determined by interpolation.

As the harmonics producing the zero beat notes may lie some distance apart, it is a further object of this invention to increase the accuracy of the interpolation and this I do by adding to or subtracting from the harmonic giving a zero beat note, harmonics of a sub-harmonic derived from the fundamental producing the zero beat note; harmonics, and, interpolating for the station frequency between harmonics of the sub-harmonic, lying on either side of the station whose frequency is to be determined.

As required by law, my present invention is defined with particularity in the appended claims. However, it may best be understood by referring to the accompanying drawing, which, it is to be clearly understood, is not to be considered in any way as limitative of my present invention but which is given solely by way of more detailed explanation of the principles underlying my present invention. The drawing, of course, illustrates a frequency measuring system hinged about the principles outlined hereinabove.

Turning to the drawing, oscillatory energy from a transmitter whose frequency is to be determined is picked up on a suitable antenna 2 and amplified preferably by a tuned radio frequency amplifier 4 supplying energy through a link circuit 6 to the tunable input circuit 8 of electron discharge device amplifier 10. The output of electron discharge device 10, preferably of the screen grid type, is fed through blocking condenser 12 to an autodyne receiver 14 comprising an electron discharge device 16 having a tickler or feed back coil 18 feeding energy to the input circuit 20 of the autodyne detector tube 16. For varying the amount of feed back and hence the amplitude of oscillations generated, a variable condenser 22 is connected between the tickler coil 18 and anode choke coil 24 and ground.

The input circuit of the autodyne comprises inductance coil 26 and condensers 28, 30 and 32 whose action will be described more fully hereinafter. The input or grid electrode of the autodyne is biased by the action of resistance 34 and blocking condenser 36.

By tuning the input circuit of the autodyne detector 16 to a frequency approximately that of a carrier wave transmitted by a station whose frequency is to be determined, the audio frequency output of the autodyne will be a beat note equal to the difference between the oscillation frequency of the autodyne and the frequency of the carrier being observed. The autodyne may be adjusted to make the frequency of this beat note zero or very nearly zero.

In order to determine the frequency of the transmitting station accurately, selected energies of known harmonic frequencies are impressed upon the autodyne receiver. These harmonic frequencies are derived from a crystal controlled oscillator 42 whose frequency is maintained very constant. The constancy of frequency of the crystal oscillator 42 may be determined by producing sub-harmonics by the use of a suitable sub-harmonic generator 44 and operating a synchronous clock 46 with the sub-harmonics from the sub-harmonic generator 44. The time kept by the clock 46 and the time registered from standard time signals may be compared by means of a chronograph 48, and from this record, the oscillator frequency may be properly adjusted to give oscillations of desired frequency.

Energy of fundamental frequency from the crystal oscillator 42 is fed to the tuned cascaded amplifiers 50, 52 preferably of the screen grid type having tunable cascading circuits 54, 56. The amplified output energy from the output circuit of electron discharge device amplifier 52 is of such a value as to overload electron discharge device 58 whose output, therefore, becomes rich in harmonics. By suitably tuning the output circuit or harmonic selector circuit 60 of harmonic producer 58 and the input circuit 8 of amplifier 10, any harmonic of the fundamental frequency of the crystal controlled oscillator 42 may be fed through blocking condenser 12 to the autodyne receiver 14. By suitably calibrating the variable condenser associated with the tunable circuit 8 ahead of amplifier 10, the exact harmonic fed to the autodyne can be readily ascertained. Circuits 60 and 20 might likewise be calibrated for the harmonics of the standard.

Now, to accurately determine the frequency of a desired indication, radio frequency amplifier 4 and tunable circuit 8 are tuned so as to pass the desired station into the autodyne receiver which is adjusted so that the signal is heard in the ear phones 40. As the next step, the condenser 9 of tunable circuit 8 is varied so as to pass a known harmonic from crystal oscillator 42. The value of this harmonic may readily be determined by suitable calibration of the dial or pointer arrangement associated with the variable condenser 9. The main condenser 32 of the autodyne receiver is then adjusted so that a beat note is heard between the chosen harmonic and the receiver, and, the tuning of the autodyne receiver is further adjusted by means of the condenser 32 until a zero beat note is obtained, in other words, until there is no sound in the ear phones 40. This exact adjustment may be produced by means of an additional trimming condenser 30. At this time, with no sound in the ear phones 40 the detector 16 will be oscillating with a frequency identical with that of the harmonic chosen by the tuning of the circuit 8. The readings of condensers 30 and 32 are then noted.

A similar procedure and a similar notation of the condenser readings are made for the harmonic on the other side of the transmitting station. Then, the station is brought in as clearly as possible and the readings on condensers 30, 32 are noted. By interpolation between the various readings, the frequency of the indicating carrier may then be quite accurately determined.

It is desirable in practice to have the harmonics generated widely separated and as much as 100 kilocycles apart. In order to increase the accuracy of the apparatus for such widely separated frequencies and in order to provide a system where say, interpolation need only be accomplished between points 10 kilocycles apart, a suitable sub-harmonic is taken from the sub-harmonic generator 44, amplified if desired, by a suitable amplifier 45 and fed to the harmonic generator 58 by opening switch 59 which otherwise short circuits the sub-harmonic away from the harmonic generator 58. Harmonics are, therefore, produced by the harmonic producer 58 of the sub-harmonics fed thereto or from another aspect it can be said that side bands are generated by feeding the sub-harmonic energy to the harmonic producer 58.

With the introduction of the sub-harmonic energy to the harmonic generator 58, after a desired station has been located and after a zero beat has been produced between a harmonic from tuned circuit 8 and the oscillations generated by the local oscillator 16 by adjustment of condensers 30, 32, as well as an initial adjustment of condenser 28 so that it has a zero reading or any definite reading, condenser 28 may then be varied to vary the local oscillations so that the beats between the local oscillations and the various side bands may be heard in the ear phones 40. Thus, assume that a rough determination has been made of the stations such that it lies between the 100th and 101st harmonic of crystal oscillator 42 operating at 100 kilocycles. Assuming that the sub-harmonic generator feeds energy of 10 kilocycles to the harmonic producer 58, then, adjustment of condenser 28 will cause beats to be heard between the 100.1 and 100.2 etc., harmonics of the fundamental. Then, it will only be necessary to interpolate between points 10 kilocycles apart in order to obtain the position of the transmitting station in frequency. Thus, after zero beat with say, the 100th harmonic, has been obtained, vernier condenser 28 is turned and the beat notes are counted up to the point where the station is heard. The zero beat note position for the harmonic of the sub-harmonic just prior to the station and the zero beat note for the harmonic just after the station is reached, as well as the position of the station itself, is noted on condenser 28 from which the position of the station can be determined by adding to or subtracting from the frequency corresponding to the tuning of the harmonic selecting circuit 8, the number of 10 kilocycle notes occurring during the adjustment of condenser 28 and the fraction of the 10 kilocycle portion of the scale that the station lies at after the last note heard before the station is heard.

The vernier condenser 28 is preferably made in the form of a pair of concentric cylinders, one of which is the cylinder of a micrometer generally used in the mechanical art. As the micrometer moves its cylinder along its axis thereby introducing it into the outer cylinder, the capacity between the two cylinders is a function of the distance at which the inner cylinder is introduced into the outer.

Condenser 30 is preferably a small trimming condenser to make more easy the adjustment of zero beat between the oscillations generated by the oscillator 16 and the harmonics selected by the tuned circuit 8.

Although the present invention has been described in connection with the determination of the frequency of a transmitter, it is to be clearly understood that it is not limited thereto. Thus, the present invention may be used equally as well for determining the frequency of crystals. In that event, of course, the transmitter would be replaced by an oscillator controlled by the crystal whose frequency is to be determined. In other words, the present invention is useful for measuring the frequency of oscillations from any source whatsoever and consequently in the claims the term "transmitter" is, therefore, to be construed broadly as including any oscillating source.

Having thus described my invention, what I claim is:

1. In a system for determining the frequency of a transmitting station, a receiver having means for generating locally, oscillations, means for combining the locally generated oscillations with received oscillations in order to receive signals from the transmitting station, a control oscillation generator, means for producing harmonics of known frequency therefrom, means for selecting harmonic energy of known frequency to one side of the frequency of said transmitting station and beating the selected energy with the locally generated energy to produce a zero beat note, means for deriving sub-harmonic energy from said control oscillator, means for adding harmonics of said sub-harmonic energy to the energy producing said zero beat note whereby the unknown frequency of the transmitting station may be determined by the algebraic addition of harmonics of the sub-harmonic energy to the harmonic of the control oscillator giving the zero beat note.

2. In a system for determining the frequency of a transmitting station, a receiver, means associated therewith for generating locally, oscillations, means for combining the locally generated oscillations with received oscillations in order to receive a signal transmitted by the station whose frequency is to be determined, a control oscillator, means for producing harmonic energy of known frequencies therefrom, means for varying the frequency of local oscillations generated by said receiver to produce a beat note with energy of selected harmonic frequency on one side of and adjacent the frequency of the transmitting station, means for generating sub-harmonic energy with energy from said control oscillator, and means for adding harmonics of said sub-harmonic energy to the harmonic giving the zero beat note whereby the frequency of the unknown station may be determined by the addition or subtraction of a harmonic of the sub-harmonic to the harmonic producing the zero beat.

3. In a system for determining the frequency of a transmitting station, an autodyne receiver, means for producing a signal indication by said autodyne receiver from the station whose frequency is to be determined, means for producing a zero beat between oscillations generated by the autodyne receiver and a harmonic of known frequency adjacent in frequency the frequency of the unknown station, means for adding harmonics of a sub-harmonic to the harmonic producing the zero beat whereby the frequency of the unknown station may be determined as lying between the harmonic producing the zero beat note plus or minus a harmonic of the sub-harmonic adjacent the station, and, the harmonic giving the zero beat note plus or minus another harmonic of the sub-harmonic adjacent the transmitting station.

4. In a system for determining the frequency of a transmitting station, an autodyne receiver, a standard frequency supply of known frequency, means for producing a signal indication from said autodyne receiver, means for producing zero beat between oscillations generated by the autodyne receiver and a known harmonic of the known standard frequency adjacent in frequency to the frequency of the unknown station, means for adding harmonics of a subharmonic of the standard frequency to the harmonic producing the zero beat whereby the frequency of the unknown station may be determined as lying between the harmonic producing the zero beat notes plus or minus a harmonic of the subharmonic and, the same harmonic giving the zero beat note plus or minus another harmonic of the subharmonic, and means for determining the relative position of the unknown frequency with respect to adjacent known frequencies by interpolation.

5. In a system for determining the frequency of a radio frequency current, a radio receiver having a local source of radio frequency oscillations adapted to receive a portion of the current whose frequency is to be determined, a standard frequency supply of known frequency, means for producing a signal indication from said receiver, means for producing zero beat between oscillations generated by said receiver and a known harmonic of the known standard frequency adjacent in frequency to the frequency of the unknown source, means for adding harmonics of a subharmonic of the standard frequency to the harmonic producing the zero beat whereby the frequency of the unknown station may be determined as lying between the harmonic producing the zero beat notes plus or minus a harmonic of the subharmonic and, the same harmonic giving the zero beat note plus or minus another harmonic of the subharmonic, and means for determining the relative position of the unknown frequency with respect to adjacent known frequencies by interpolation.

6. In a system for determining the frequency of a transmitting station, a heterodyne receiver, a standard frequency supply of known frequency, means for producing a signal indication from said heterodyne receiver, means for producing zero beat between oscillations generated by the heterodyne receiver and a known harmonic of the known standard frequency adjacent in frequency to the frequency of the unknown station, means for adding harmonics of a subharmonic of the standard frequency to the harmonic producing the zero beat whereby the frequency of the unknown station may be determined as lying between the harmonic producing the zero beat notes plus or minus a harmonic of the subharmonic and, the same harmonic giving the zero beat note plus or minus another harmonic of the subharmonic, and means for determining the relative position of the unknown frequency with respect to adjacent known frequencies by interpolation.

7. In a system for determining the frequency of a transmitting station, an autodyne receiver, a standard frequency source of known frequency having an output circuit coupled to an input circuit of said autodyne receiver, means for deriving a sub-harmonic of the oscillations of said source, means for deriving two harmonics of said sub-harmonic, one on each side of the unknown frequency of said transmitting station, a nonlinear discharge tube stage for combining the energies of said harmonics with harmonics of said standard frequency and means for determining by interpolation the relation between the unknown frequency impressed upon said autodyne receiver and the two derived harmonics which lie closest to and on each side of said unknown frequency.

8. In a system for determining the frequency of a source of waves of unknown frequency, a heterodyne oscillator, a standard frequency supply of known frequency, means for producing known frequencies adjacent to and on each side of the unknown frequency by the proper combination of generated harmonics of the standard frequency with harmonics of generated subharmonics of the standard frequency and waves from the oscillator, and means for interpolating between these two known frequencies to determine the relative position of the unknown frequency.

9. In a system for fixing the frequency of a source of waves, a variable oscillator, a standard frequency supply of known frequency, means for producing an indication between waves from said source and oscillator, means for producing zero beat between oscillations generated by the oscillator and a known harmonic of the known standard frequency adjacent in frequency to the frequency of the source of waves, means for adding harmonics of a sub-harmonic of the standard frequency to the harmonic producing the zero beat whereby the frequency of the source may be fixed as lying between the harmonic producing the zero beat plus or minus an harmonic of the sub-harmonic, and the same harmonic giving the zero beat note plus or minus another harmonic of the sub-harmonic, and means for fixing the relative position of the source with respect to adjacent known frequencies by interpolation.

HAROLD O. PETERSON.